(12) United States Patent
Zhu et al.

(10) Patent No.: US 9,986,562 B2
(45) Date of Patent: May 29, 2018

(54) METHOD FOR REPORTING CHANNEL STATE INFORMATION AND BASE STATION

(75) Inventors: Peng Zhu, Shenzhen (CN); Bo Dai, Shenzhen (CN); Chunli Liang, Shenzhen (CN); Bin Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 368 days.

(21) Appl. No.: 13/640,223

(22) PCT Filed: Dec. 20, 2010

(86) PCT No.: PCT/CN2010/080019
§ 371 (c)(1),
(2), (4) Date: Oct. 9, 2012

(87) PCT Pub. No.: WO2012/022096
PCT Pub. Date: Feb. 23, 2012

(65) Prior Publication Data
US 2013/0142134 A1 Jun. 6, 2013

(30) Foreign Application Priority Data
Aug. 16, 2010 (CN) .......................... 2010 1 0259088

(51) Int. Cl.
*H04W 4/00* (2018.01)
*H04W 72/04* (2009.01)
(Continued)

(52) U.S. Cl.
CPC ....... *H04W 72/0453* (2013.01); *H04L 1/0026* (2013.01); *H04L 1/0027* (2013.01);
(Continued)

(58) Field of Classification Search
None
See application file for complete search history.

(56) References Cited

U.S. PATENT DOCUMENTS

2011/0274043 A1* 11/2011 Nam ................. H04L 5/001
370/328
2011/0299484 A1* 12/2011 Nam ................. H04L 1/0025
370/329

(Continued)

FOREIGN PATENT DOCUMENTS

CN       101227717 A       7/2008
CN       101233774 A       7/2008
(Continued)

OTHER PUBLICATIONS

International Search Report for PCT/CN2010/080019 dated Apr. 30, 2011.
(Continued)

*Primary Examiner* — Jutai Kao
(74) *Attorney, Agent, or Firm* — Ling Wu; Stephen Yang; Ling and Yang Intellectual Property (57) ABSTRACT

A method for reporting channel state information is provided in the invention, which includes: an eNB (eNodeB) indicating UE to feed back CSI (channel state information) reporting of one or multiple component carriers at a time; the UE feeds back the CSI reporting of one or multiple component carriers at a time according to the indication of eNB. The invention also provides an eNB, which is configured to: indicate UE to feed back CSI reporting of one or multiple component carriers at a time. In the invention, the problem how the UE performs channel state information reporting for multiple (downlink) component carriers in the LTE-A system is solved, which can not only ensure the reliability of transmitting channel state information but also reduce the feedback delay of channel state information as soon as possible.

17 Claims, 1 Drawing Sheet

```
The eNB indicates the UE to feed back the CSI
reporting of one or multiple CCs at a time
            │
            ▼
The UE feeds back the CSI reporting of one or
multiple CCs at a time according to the indication
from the eNB
```

(51) Int. Cl.
  *H04L 5/00* (2006.01)
  *H04L 5/14* (2006.01)
  *H04W 24/10* (2009.01)
  *H04L 1/00* (2006.01)
  *H04W 88/02* (2009.01)
  *H04W 88/08* (2009.01)
  *H04W 72/08* (2009.01)

(52) U.S. Cl.
  CPC ............ *H04L 5/001* (2013.01); *H04L 5/0057* (2013.01); *H04L 5/0082* (2013.01); *H04L 5/0083* (2013.01); *H04L 5/0087* (2013.01); *H04L 5/0094* (2013.01); *H04L 5/14* (2013.01); *H04W 24/10* (2013.01); *H04L 5/0028* (2013.01); *H04W 72/085* (2013.01); *H04W 88/02* (2013.01); *H04W 88/08* (2013.01)

(56) References Cited

U.S. PATENT DOCUMENTS

| | | | | |
|---|---|---|---|---|
| 2011/0305161 | A1* | 12/2011 | Ekpenyong | H04L 1/0031 370/252 |
| 2012/0076017 | A1* | 3/2012 | Luo et al. | 370/252 |

FOREIGN PATENT DOCUMENTS

| | | |
|---|---|---|
| CN | 101243632 A | 8/2008 |
| CN | 101426225 A | 5/2009 |
| CN | 101615984 A | 12/2009 |
| CN | 101646247 A | 2/2010 |
| CN | 101777965 A | 7/2010 |
| CN | 101908951 A | 12/2010 |
| JP | 2010161800 A | 7/2010 |
| KR | 20090085004 A | 8/2009 |
| WO | 2010048142 A1 | 4/2010 |
| WO | 2010076042 A1 | 7/2010 |

OTHER PUBLICATIONS

PUCCH design for carrier aggregation:; 12.1: Huawei; Discussion and Decision; 3GPP TSG RAN WG1 Meeting#56; Athens, Greece, Feb. 9-13, 2009; R1-090813; see pp. 1-6.

"UL control channel design to support carrier aggregation"; 15.4; LG Electronics; Discussion; 3GPP TSG RAN WG1 #56bis; Seoul, Korea; Mar. 23-27, 2009; R1-091204; see pp. 1-6.

"Updates on TR36.912"; LTE-Advanced Rapporteur NTT DOCOMO; R1; FS_RAN_LTEA; B; 3GPP TSG RAN WG1 Meeting #59; Jeju, Korea, Nov. 9-13, 2009; R1-905; see pp. 1-11.

"UCI on PUSCH for carrier aggregation"; 6.2.7; Huawei; Discussion/Decision; 3GPP TSG WG1 Meeting #61bis; Dresden, Germany, Jun. 28-Jul. 2, 2010; R1-103890; see pp. 1-3.

CQI feedback for LTE-A, 3GPP TSG RAN WG1 Meeting #61 bis; Dresden, Jun. 28-Jul. 2, 2010; CATT; R1-103474.

Further Discussions on SRS Enhancements, TSG-RAN WG1#60, San Francisco, USA, Feb. 22-26, 2010. Ericsson, ST-Ericsson. R1-100860.

* cited by examiner

METHOD FOR REPORTING CHANNEL STATE INFORMATION AND BASE STATION

TECHNICAL FIELD

The present invention relates to the field of wireless communication, and in particular, to a method for reporting channel state information and base station.

BACKGROUND OF THE RELATED ART

In the 3rd Generation Partnership Project Long Term Evolution (3GPP LTE) system, User Equipment (UE) acquires Channel State Information (CSI) of a downlink channel according to a downlink reference signal, and then feeds the acquired CSI back to an eNodeB (eNB). According to the CSI fed back by the UE, the eNB determines the modulation and coding scheme and the physical resource location and the transmission mode of data sent to the UE. In a LTE system, there are three kinds of CSI: Channels Quality Indication (CQI), Pre-coding Matrix Indicator (PMI) and Rank Indicator (RI).

In the LTE system, UE feeds back the CSI of the downlink channel in two ways, which includes periodic feedback and aperiodic feedback, and the two ways are referred to as periodic CSI reporting and aperiodic CSI reporting respectively. The so-called periodic CSI reporting means that the UE feeds back CSI periodically according to the configuration by the eNB; the so-called aperiodic CSI reporting means that the eNB triggers the UE to feed back CSI for one time through a triggering signaling. For the periodic CSI reporting, generally speaking, if the UE has not sent a Physical Uplink Shared Channel (PUSCH) on a certain subframe, the CSI is transmitted on a Physical Uplink Control Channel (PUCCH); if the UE has sent the PUSCH, the CSI is born on the PUSCH for transmission. For the aperiodic CSI reporting, the CSI is only transmitted on the PUSCH.

In the LTE system, the eNB schedules a certain UE to send PUSCH through an uplink grant signaling. The uplink grant signaling can be born in a Downlink Control Information (DCI) format 0, and it is sent to the scheduled UE by a Physical Downlink Control Channel (PDCCH). 1 bit in DCI format 0 is used to trigger the UE to perform the aperiodic CSI reporting, which is called as CQI request.

If the UE detects the PDCCH which is with DCI format 0 and belongs to the UE, the UE sends the PUSCH according to the UL grant contained in the PDCCH. If the UE detects that the 1 bit CQI request is set as "1" in the DCI format 0, the aperiodic CSI reporting is sent in the PUSCH scheduled by the DCI format 0.

Besides the CQI request, the uplink scheduling information in the DCI format 0 further includes: 1 bit hopping flag used to indicate hopping enabled; resource block distribution and hopping resource distribution, 5 bits MCS Index ($I_{MCS}$); 1 bit New data indicator (NDI); 2 bits TPC command for scheduled PUSCH; 3 bits Cyclic shift for DM RS and so on.

Wherein, 5 bits MCS Index ($I_{MCS}$) is used to indicate jointly the Modulation and Coding Scheme (MCS) and Redundancy Version (RV), as shown in Table 1. The contents jointly indicated by $I_{MCS}$ include modulation order $Q'_m$, Transport Block Size (TBS) index $I_{TBS}$ and redundancy version $rv_{idx}$.

TABLE 1

MCS index of PUSCH and corresponding modulation order, transport block size index and redundancy version

| MCS Index$^{IMCS}$ | Modulation Order$^{Qm'}$ | TBS Index$^{ITBS}$ | Redundancy Version$rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | Reserved | | 1 |
| 30 | | | 2 |
| 31 | | | 3 |

The UE determines the modulation order $Q_m$ and Transport Block Size (TBS) according to the modulation order $Q'_m$, the TBS index $I_{TBS}$ and related signaling and rules corresponding to the MCS index $I_{MCS}$.

In the LTE system, when CQI request is 1 and $I_{MCS}$ is 29 in the DCI format 0, and the bandwidth of the scheduled PUSCH is: $N_{PRB} \leq 4$, then aperiodic CSI reporting is triggered, and no transport block bearing an Uplink Shared Channel (UL-SCH) is transmitted in the scheduled PUSCH.

Additionally, a type of special UL grant, which is called as Random Access Response Grant (RAR grant) signaling, is born in the PDSCH to be sent to the corresponding UE which initiates the random access. In the non-contention based random access procedure, RAR grant also includes 1 bit CQI request used to trigger the aperiodic CSI feedback. If the UE, which initiates the random access, detects the RAR grant belonging to the UE, the PUSCH is sent based on this, and the PUSCH is called as First scheduled UL transmission, which is also called as Message 3 (Msg.3) during random access. If the UE detects that the 1 bit CQI request is set as "1" in the RAR grant, the CSI, which is fed back aperiodically, is sent in Msg.3. In the contention based random access procedure, the 1 bit CQI request is reserved in the RAR grant, and is not used to trigger the aperiodic CSI feedback.

According to feedback type of CQI and PMI, periodic/aperiodic CSI reporting respectively have multiple kinds of reporting modes, as shown in Table 2 and Table 3. Each kind of reporting mode corresponds to certain CSI reporting contents and reporting format. Which kind of reporting mode UE will adopt is indicated by parameters configured through higher-layer signalling (parameters cqi-FormatIndicatorPeriodic and cqi-ReportModeAperiodic indicates respectively periodic/aperiodic CSI reporting mode), and it is related to downlink transmission modes configured for the UE, i.e. under a particular transmission mode, only the corresponding CSI reporting mode can be configured.

TABLE 2

Periodic CSI reporting mode and corresponding CQI/PMI feedback type

|  |  | PMI Feedback Type | |
| --- | --- | --- | --- |
|  |  | No PMI | Single PMI |
| PUCCH CQI Feedback Type | wideband CQI | Mode 1-0 | Mode 1-1 |
|  | UE Selected subband CQI | Mode 2-0 | Mode 2-1 |

TABLE 3

Aperiodic CSI reporting mode and corresponding CQI/PMI feedback type

|  |  | PMI feedback type | | |
| --- | --- | --- | --- | --- |
|  |  | No PMI | Single PMI | Multiple PMI |
| PUSCH CQI Feedback Type | Wideband CQI |  |  | Mode 1-2 |
|  | UE selected subband CQI | Mode 2-0 |  | Mode 2-2 |
|  | Higher Layer-configured subband CQI | Mode 3-0 | Mode 3-1 |  |

Figure 1:
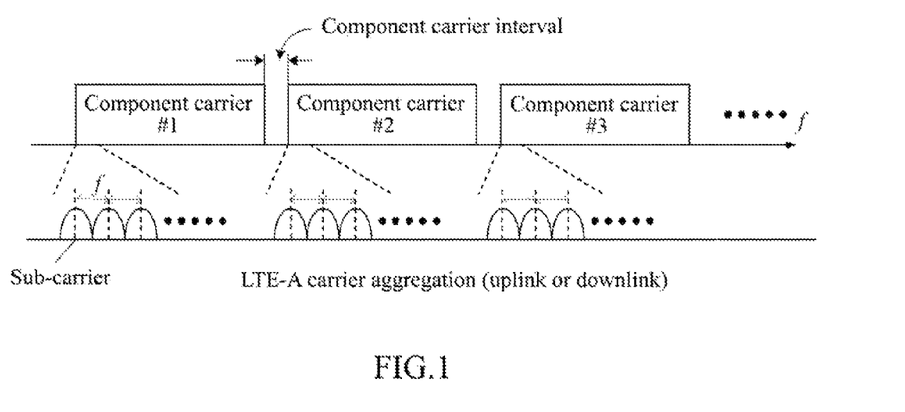
FIG. 1 illustrates the carrier aggregation in LTE-A system.

LTE-Advanced (LTE-A) system is the next generation evolved system of LTE system, and it extends transmission bandwidth by carrier aggregation (CA) technology to support bigger peak transmission rate. FIG. 1 illustrates the carrier aggregation of LTE-A system according to related technology. As shown in FIG. 1, each aggregated carrier is called as "component carrier (CC)". Multiple CCs can be located in the same frequency band and can also be located in different frequency bands.

During carrier aggregation, there is one primary component carrier (PCC), which is also called as primary cell (Pcell) of the UE, in the multiple CCs configured or activated for the UE by the eNB, and other CCs configured for the UE are called as secondary component carriers (SCCs) or secondary cells (Scells) of the UE. Channel quality of the PCC is usually thought to be better. In the related art, it is proposed that UE can only send PUCCH and semi-persistently scheduled (SPS) PUSCH on its PCC, but it can not send the PUCCH or SPS PUSCH on other SCCs.

In the LTE-A system, an eNB can send signals to the same UE on multiple (downlink) CCs, therefore, the UE needs to feed back CSI of each CC which is configured or activated when the eNB configures or activates multiple (downlink) CCs for the UE. In the related art, it is proposed that each (downlink) CC can be configured individually with downlink transmission mode and CSI reporting mode for the same one UE. Then, the UE feeds back the CSI corresponding to CC according to the CSI reporting mode of each (downlink) CC. In the related art, two CSI reporting methods are also proposed under the circumstance of carrier aggregation.

Method I, UE feeds back the CSI reporting of one (downlink) CC at a time;

Method II, UE feeds back the CSI reporting of multiple (downlink) CCs at a time.

Feedback delay can be reduced if CSI reporting of multiple (downlink) CCs is fed back at a time, thereby improving downlink performance, and overheads of triggering signalling can be also saved for aperiodic CSI feedback.

However, when CSI of multiple (downlink) CCs is fed back simultaneously, the feedback overhead will be increased, and under certain circumstances, it may cause redundant CSI reporting and may also influence the reliability of CSI reporting and uplink data transmission. Therefore, under the circumstance of carrier aggregation, it is an urgent problem how the UE performs channel state information reporting on multiple (downlink) CCs, which can not only ensure the reliability of channel state information transmission but also reduce the feedback delay of channel state information as soon as possible.

In addition, it is also proposed in the related art that cross-carrier scheduling is supported in the LTE-A system, i.e. scheduling information of other CCs is sent on one CC, and the scheduling information is born in the PDCCH with particular DCI format to be sent to the scheduled UE, and carrier indicator field (CIF) is introduced into the DCI Format to identify the scheduled CC. Currently, 5 CCs can be aggregated in LTE-A system at most, and CIF is 3 bits. Whether the cross-carrier scheduling is performed and whether the CIF is included in the DCI format are configured by high-layer signalling.

SUMMARY OF THE INVENTION

The technical problem to be solved in the present invention is to provide a method for reporting channel state information, to ensure the reliability of transmitting channel state information and also reduce the feedback delay of the channel state information as soon as possible.

To solve the abovementioned problem, the present invention provides a method for reporting channel state information, comprising:

an eNB (eNodeB) indicating UE to feed back CSI (channel state information) reporting of one or multiple component carriers at a time.

Feeding back CSI reporting of one or multiple component carriers at a time comprises feeding back CSI reporting of one or multiple component carriers on one subframe at a time.

The multiple component carriers comprises all or part of component carriers which are configured or activated for the UE in a time division duplex system, or comprises all or part of downlink component carriers which are configured or activated for the UE in a frequency division duplex system.

The eNB indicating the UE to feed back CSI reporting of one component carrier at a time comprises that the eNB makes the UE unable to feed back CSI reporting of multiple component carriers at a time, i.e. the UE can only feed back the CSI reporting of one component carrier at a time;

the eNB indicating the UE to feed back CSI reporting of multiple component carriers at a time comprises that the eNB enables the UE to feed back CSI reporting of multiple component carriers at a time, i.e. the UE feeds back the CSI reporting of one or multiple component carriers at a time.

The multiple component carriers are a group of component carriers.

The multiple component carriers are a group of component carriers which are preset or a group of component carriers which are configured by a high layer; or, the multiple component carriers are a group of component carriers which meet a certain preset relationship in component carriers configured or activated for the UE.

The eNB indicating the UE to feed back CSI reporting of one or multiple component carriers at a time comprises:

the eNB configuring the UE to feed back periodic CSI reporting of one or multiple component carriers at a time through high layer signaling.

The CSI reporting is a periodic CSI reporting; and the multiple component carriers are component carriers which are configured with an identical periodic CSI reporting mode in component carriers configured or activated for the UE; or the multiple component carriers are component carriers which are configured with an identical downlink transmission mode and an identical periodic CSI reporting mode in component carriers configured or activated for the UE.

The method further comprises: when the UE feeds back the periodic CSI reporting of multiple component carriers at a time, the periodic CSI reporting is transmitted on one or more PUCCH (physical uplink control channel) with a particular format, or transmitted on a PUSCH (physical uplink shared channel).

The step of the eNB indicating UE to feed back CSI reporting of one or multiple component carriers at a time comprises:

the eNB configuring the UE to feed back aperiodic CSI reporting of one or multiple component carriers at a time through high layer signaling, or indicating the UE to feed back aperiodic CSI reporting of one or multiple component carriers at a time through a dynamic indication, or indicating the UE to feed back aperiodic CSI reporting of one or multiple component carriers at a time through a way of combining high layer signaling configuration with dynamic indication.

The feeding back the aperiodic CSI reporting of one component carrier at a time comprises that one aperiodic CSI reporting triggering command triggers the UE to feed back the aperiodic CSI reporting of one component carrier on one subframe;

the feeding back the aperiodic CSI reporting of multiple component carriers at a time comprises that one aperiodic CSI reporting triggering command triggers the UE to feed back the aperiodic CSI reporting of one or multiple component carriers on one subframe; or, the feeding back the aperiodic CSI reporting of multiple component carriers at a time comprises that multiple aperiodic CSI reporting triggering commands trigger the UE to feed back the aperiodic CSI reporting of multiple component carriers on one subframe; or, the feeding back the aperiodic CSI reporting of multiple component carriers at a time comprises that one aperiodic CSI reporting triggering command triggers the UE to feed back in turn the aperiodic CSI reporting of each component carrier in multiple component carriers according to a certain rule on multiple subframes.

Indicating the UE to feed back aperiodic CSI reporting of one or multiple component carriers at a time through a way of combining high layer signaling configuration with dynamic indication comprises:

when the UE is configured through the high layer signaling to feed back the aperiodic CSI reporting of one component carrier at a time, one triggering command triggering the UE to feed back the aperiodic CSI reporting of one component carrier;

when the UE is configured through the high layer signaling to feed back the aperiodic CSI reporting of multiple component carriers at a time, triggering the UE to feed back the aperiodic CSI reporting of one or multiple component carriers at a time based on the dynamic indication of the eNB;

or, when the UE is configured through the high layer signaling to be unable to feed back the aperiodic CSI reporting of multiple component carriers at a time, one triggering command triggering the UE to feed back the aperiodic CSI reporting of one component carrier;

when the UE is configured through the high layer signaling to be able to feed back the aperiodic CSI reporting of multiple component carriers at a time, triggering the UE to feed back the aperiodic CSI reporting of one or multiple component carriers at a time based on the dynamic indication of the eNB.

The dynamic indication comprises: in a PDCCH with a particular downlink control information format, when a CQI request indicates that the aperiodic CSI reporting is triggered, a NDI (new data indicator) is a first preset value, $I_{MCS}=29$ and bandwidth of the scheduled PUSCH $N_{PRB} \geq 4$, triggering the UE to feed back the aperiodic CSI reporting of multiple component carriers; when the CQI request indicates that the aperiodic CSI reporting is triggered, the NDI is a second preset value different from the first preset value, $I_{MCS}=29$, and bandwidth of the scheduled PUSCH $N_{PRB} \leq 4$, triggering the UE to feed back the aperiodic CSI reporting of one component carrier.

The dynamic indication further comprises: in the PDCCH with the particular downlink control information format, when the CQI request indicates that the aperiodic CSI reporting is triggered, and $I_{MCS} \neq 29$ or bandwidth of the scheduled PUSCH $N_{PRB} > 4$, triggering the UE to feed back the aperiodic CSI reporting of one component carrier.

The dynamic indication comprises: in the PDCCH with the particular downlink control information format, when the CQI request indicates that the aperiodic CSI reporting is triggered, and the NDI and/or $I_{MCS}$ is in a preset state, triggering the UE to feed back the aperiodic CSI reporting of multiple component carriers; when the CQI request indicates that the aperiodic CSI reporting is triggered, and the NDI and/or $I_{MCS}$ is not in the preset state, triggering the UE to feed back the aperiodic CSI reporting of one component carrier.

The dynamic indication comprises: in the PDCCH with the particular downlink control information format, when the CQI request indicates that the aperiodic CSI reporting is triggered, an aperiodic CSI reporting way identification field is also carried in the PDCCH and is used to indicate and trigger the UE to feed back the aperiodic CSI reporting of one or multiple component carriers.

When the CQI request indicates that the aperiodic CSI reporting is not triggered, the aperiodic CSI reporting way identification field is used to indicate uplink scheduling information of the scheduled PUSCH.

The aperiodic CSI reporting way identification field is of 1 bit.

The dynamic indication comprises: in the PDCCH with the particular downlink control information format, when the CQI request indicates that the aperiodic CSI reporting is triggered, and the PDCCH schedules the UE to send PUSCH on a preset component carrier, triggering the UE to feed back the aperiodic CSI reporting of multiple component carriers; otherwise, triggering the UE to feed back the aperiodic CSI reporting of one component carrier.

The dynamic indication comprises: during cross-carrier scheduling, in the PDCCH with the particular downlink control information format, when the CQI request indicates that the aperiodic CSI reporting is triggered and a carrier indicator field (CIF) is a preset value, triggering the UE to feed back the aperiodic CSI reporting of multiple component carriers; otherwise, triggering the UE to feed back the aperiodic CSI reporting of one component carrier.

The CSI reporting is an aperiodic CSI reporting, the multiple component carriers are the component carriers configured with identical aperiodic CSI reporting modes in the component carriers configured or activated for the UE, or are the component carriers configured with identical downlink transmission mode and identical aperiodic CSI reporting mode in the component carriers configured or activated for the UE.

To solve the abovementioned problem, the present invention also provides An eNB (eNodeB), which is configured to:

indicate UE to feed back CSI (channel state information) reporting of one or multiple component carriers at a time.

The eNB is configured to indicate the UE to feed back CSI reporting of one or multiple component carriers on a subframe at a time.

The eNB is configured to indicate the UE to feed back the CSI reporting of one component carrier at a time in the following way: making the UE unable to feed back the CSI reporting of multiple component carriers at a time; and the eNB is configured to indicate the UE to feed back the CSI reporting of multiple component carriers at a time in the following way: the eNB enabling the UE to feed back the CSI reporting of multiple component carriers at a time.

The multiple component carriers are a group of component carriers.

The multiple component carriers are a group of component carriers which are preset or a group of component carriers which are configured by a high layer; or, the multiple component carriers are a group of component carriers which meet a certain preset relationship in component carriers configured or activated for the UE.

The eNB is used to configure the UE to feed back periodic CSI reporting of one or multiple component carriers at a time through high layer signaling.

The CSI reporting is a periodic CSI reporting, and the multiple component carriers are component carriers which are configured with an identical periodic CSI reporting mode in component carriers configured or activated for the UE; or the multiple component carriers are component carriers which are configured with an identical downlink transmission mode and an identical periodic CSI reporting mode in component carriers configured or activated for the UE.

The eNB is configured to configure the UE to feed back aperiodic CSI reporting of one or multiple component carriers at a time through high layer signaling, or indicate the UE to feed back aperiodic CSI reporting of one or multiple component carriers at a time through a dynamic indication, or indicate the UE to feed back aperiodic CSI reporting of one or multiple component carriers at a time through a way of combining high layer signaling configuration with dynamic indication.

The feeding back the aperiodic CSI reporting of one component carrier at a time comprises that one aperiodic CSI reporting triggering command triggers the UE to feed back the aperiodic CSI reporting of one component carrier on one subframe;

the feeding back the aperiodic CSI reporting of multiple component carriers at a time comprises that one aperiodic CSI reporting triggering command triggers the UE to feed back the aperiodic CSI reporting of one or multiple component carriers on one subframe; or, the feeding back the aperiodic CSI reporting of multiple component carriers at a time comprises that multiple aperiodic CSI reporting triggering commands trigger the UE to feed back the aperiodic CSI reporting of multiple component carriers on one subframe; or, the feeding back the aperiodic CSI reporting of multiple component carriers at a time comprises that one aperiodic CSI reporting triggering command triggers the UE to feed back in turn the aperiodic CSI reporting of each component carrier in multiple component carriers according to a certain rule on multiple subframes.

The eNB is configured to:

when the UE is configured through the high layer signaling to feed back the aperiodic CSI reporting of one component carrier at a time, use one triggering command to trigger the UE to feed back the aperiodic CSI reporting of one component carrier;

when the UE is configured through the high layer signaling to feed back the aperiodic CSI reporting of multiple component carriers at a time, trigger the UE to feed back the aperiodic CSI reporting of one or multiple component carriers at a time based on the dynamic indication of the eNB; or, when the UE is configured through the high layer signaling to be unable to feed back the aperiodic CSI reporting of multiple component carriers at a time, use one triggering command to trigger the UE to feed back the aperiodic CSI reporting of one component carrier;

when the UE is configured through the high layer signaling to be able to feed back the aperiodic CSI reporting of multiple component carriers at a time, trigger the UE to feed back the aperiodic CSI reporting of one or multiple component carriers at a time based on the dynamic indication of the eNB.

The eNB is configured to perform the dynamic indication in the following way: in a PDCCH with a particular downlink control information format, when a CQI request indicates that the aperiodic CSI reporting is triggered, and a NDI (new data indicator) is a first preset value, $I_{MCS}=29$, and bandwidth of the scheduled PUSCH $N_{PRB}\leq4$, trigger the UE to feed back the aperiodic CSI reporting of multiple component carriers; when the CQI request indicates that the aperiodic CSI reporting is triggered, and the NDI is a second preset value different from the first preset value, $I_{MCS}=29$, and bandwidth of the scheduled PUSCH $N_{PRB}\leq4$, trigger the UE to feed back the aperiodic CSI reporting of one component carrier.

The eNB is configured to perform the dynamic indication in the following way: in the PDCCH with the particular downlink control information format, when the CQI request indicates that the aperiodic CSI reporting is triggered, and $I_{MCS}\neq29$ or bandwidth of the scheduled PUSCH $N_{PRB}>4$, trigger the UE to feed back the aperiodic CSI reporting of one component carrier.

The eNB is configured to perform the dynamic indication in the following way: in the PDCCH with the particular downlink control information format, when the CQI request indicates that the aperiodic CSI reporting is triggered and the NDI and/or $I_{MCS}$ is in a preset state, trigger the UE to feed back the aperiodic CSI reporting of multiple component carriers; when the CQI request indicates that the aperiodic CSI reporting is triggered and the NDI and/or $I_{MCS}$ is not in the preset state, trigger the UE to feed back the aperiodic CSI reporting of one component carrier; or the eNB is configured to perform the dynamic indication in the following way: in the PDCCH with the particular downlink control information format, when the CQI request indicates that the aperiodic CSI reporting is triggered, an aperiodic CSI reporting way identification field is also carried in the PDCCH and is used to indicate and trigger the UE to feed back the aperiodic CSI reporting of one or multiple component carriers; when the CQI request indicates that the aperiodic CSI reporting is not triggered, the aperiodic CSI reporting way identification field is used to indicate uplink scheduling information of the scheduled PUSCH; or, the eNB is configured to perform the dynamic indication in the following way: in the PDCCH with the particular downlink control information format, when the CQI request indicates that the aperiodic CSI reporting is triggered and the PDCCH schedules the UE to send PUSCH on a preset component carrier, trigger the UE to feed back the aperiodic CSI reporting of multiple component carriers; otherwise, trigger the UE to feed back the aperiodic CSI reporting of one component carrier; or, the eNB is configured to perform the dynamic indication in the following way: during cross-carrier scheduling, in the PDCCH with the particular downlink control information format, when the CQI request indicates that the aperiodic CSI reporting is triggered and a carrier indicator field (CIF) is a preset value, trigger the UE to feed back the aperiodic CSI reporting of multiple component carriers; otherwise, trigger the UE to feed back the aperiodic CSI reporting of one component carrier.

In the PDCCH with the particular downlink control information format, when the CQI request indicates that the aperiodic CSI reporting is triggered, an aperiodic CSI reporting way identification field is also carried in the PDCCH and is used to indicate and trigger the UE to feed back the aperiodic CSI reporting of one or multiple component carriers, and the aperiodic CSI reporting way identification field is of 1 bit.

The CSI reporting is an aperiodic CSI reporting, and the multiple component carriers are the component carriers configured with identical aperiodic CSI reporting modes in the component carriers configured or activated for the UE, or the multiple component carriers are the component carriers configured with identical downlink transmission mode and identical aperiodic CSI reporting mode in the component carriers configured or activated for the UE.

By adopting the method in the present invention, the problem how the UE performs channel state information reporting for multiple (downlink) component carriers in the LTE-A system is solved, which not only ensures the reliability of transmitting channel state information but also reduces the feedback delay of channel state information as soon as possible.

PREFERRED EMBODIMENTS OF THE PRESENT INVENTION

The embodiments of the present invention will be illustrated in detail with combination of drawings in the following. It needs to be noted that the embodiments of the present invention, as well as the features in the embodiments, can be combined randomly with each other when there is no confliction.

Figure 2:
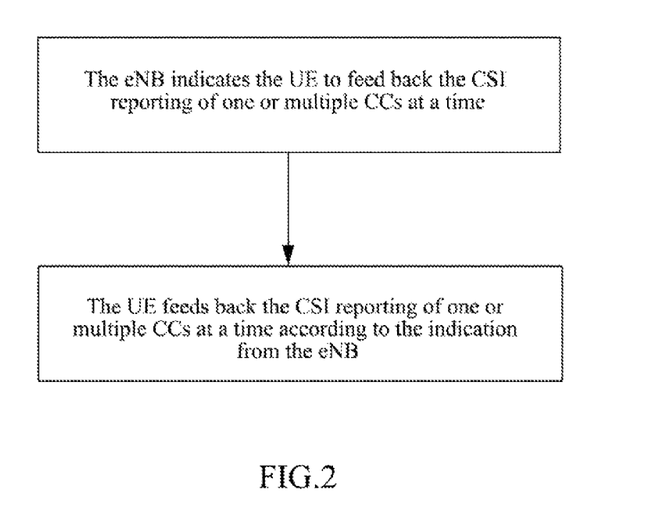
FIG. 2 is a schematic diagram of the method for reporting state information in the present invention.

The present invention provides a method for reporting channel state information, as shown in FIG. 2, and the method comprises: an eNB indicating UE to feed back CSI reporting of one or multiple component carriers at a time. The UE feeds back the CSI reporting of one or multiple component carriers at a time according to the indication from the eNB.

The component carriers are the downlink component carriers (DL CC) in a Frequency Division Duplex (FDD) system, or the component carriers in a Time Division Duplex (TDD) system.

Preferably, the feeding back CSI reporting of one or multiple component carriers at a time refers to feeding back CSI reporting of one or multiple component carriers on a subframe.

Preferably, the eNB indicating the UE to feed back CSI reporting of one component carrier at a time refers to that the eNB makes the UE unable to feed back CSI reporting of multiple component carriers at a time, i.e. the UE can only feed back the CSI reporting of one component carrier at a time;

the eNB indicating the UE to feed back CSI reporting of multiple component carriers at a time refers to that the eNB enables the UE to feed back CSI reporting of multiple component carriers at a time, i.e. the UE feeds back the CSI reporting of one or multiple component carriers at a time.

The multiple component carriers are a group of component carriers.

Preferably, the multiple component carriers refers to all the component carriers which are configured or activated for the UE (in TDD system), or refers to all downlink component carriers which are configured or activated for the UE (in FDD system).

Preferably, the multiple component carriers refers to part of the component carriers which are configured or activated for the UE (in TDD system), or refers to part of downlink component carriers which are configured or activated for the UE (in FDD system).

Preferably, the multiple component carriers are preset or the multiple component carriers are configured by a high layer.

Preferably, the multiple component carriers refer to the component carriers which meet a certain preset relationship in component carriers configured or activated for the UE.

For example, the multiple component carriers are the component carriers whose remainders of CC indexes (component carrier index) are same after performing modulo-2 operation in the component carriers configured or activated for the UE.

For another example, in the FDD system, the multiple component carriers are the downlink component carriers corresponding to the same one uplink component carrier in the downlink component carriers configured or activated for the UE.

For another example, in the FDD system, for one UE, if there exists such a DL SCC whose corresponding uplink CC is not configured or activated for the UE, then all such DL SCCs are combined with the DL PCC of the UE to be a group of CCs.

For example, said a group of CCs refers to the CCs configured with the same downlink transmission mode in the CCs configured or activated for the UE.

Specially, if there is only one CC configured or activated for the UE for a certain downlink transmission mode, then said a group of CCs includes only the one CC.

For example, said a group of CCs refers to the CCs in the same frequency band in the CCs configured or activated for the UE.

Specially, if there is only one CC configured or activated for the UE in a certain frequency band, then said a group of CCs includes only the one CC.

(I) Periodic CSI Reporting

Preferably, the multiple component carriers refer to component carriers which are configured with an identical periodic CSI reporting mode in component carriers configured or activated for the UE.

Preferably, the multiple component carriers refer to component carriers which are configured with an identical downlink transmission mode and an identical periodic CSI reporting mode in component carriers configured or activated for the UE.

If the eNB indicates the UE to feed back the periodic CSI reporting of multiple CCs at a time and the CCs configured or activated for the UE are divided into multiple groups, the UE feeds back the periodic CSI reporting of each group of CCs in turn according to a certain rule.

When the UE feeds back the periodic CSI reporting, the UE feeds back the periodic CSI reporting of the corresponding CC according to the configured periodic CSI reporting mode of each CC.

The eNB configures the UE to feed back the periodic CSI reporting of one or multiple CCs at a time through a high layer signaling.

Embodiment One

Two periodic CSI reporting ways are defined:
way one, the periodic CSI reporting of one CC is fed back at a time;
way two, the periodic CSI reporting of multiple CCs are fed back at a time.

The eNB configures the periodic CSI reporting way of a certain UE to be way one or way two through high layer signaling. When the way two is configured, the UE feeds back the periodic CSI reporting of all the configured or activated (downlink) CCs at a time.

Embodiment Two

The eNB enables a certain UE to feed back the periodic CSI reporting of multiple CCs at a time through high layer signaling.

For a certain UE, if it is not enabled to feed back the periodic CSI reporting of multiple CCs at a time, the UE feeds back the periodic CSI reporting of one configured or activated (downlink) CC at a time; if for the UE, it is enabled to feed back the periodic CSI reporting of multiple CCs at a time, the UE feeds back the periodic CSI reporting of all the configured or activated (downlink) CCs at a time.

When the UE feeds back the periodic CSI reporting of multiple CCs at a time, the periodic CSI reporting is transmitted on a PUCCH with a particular format, or transmitted on multiple PUCCHs, or transmitted on a PUSCH.

The PUCCH with a particular format refers to the PUCCH dedicated to bearing large amount of uplink control information.

When the UE feeds back the periodic CSI reporting of multiple CCs at a time, the eNB activates one SPS PUSCH for the UE to bear the periodic CSI reporting.

The SPS PUSCH is transmitted on the PCC of the UE.

During the transmission of the SPS PUSCH, if the eNB dynamically schedules the UE to send PUSCH on its PCC, then the dynamically scheduled PUSCH is prior to the SPS PUSCH, that is to say, the UE sends the dynamically schedule PUSCH and does not send the SPS PUSCH.

(II) Aperiodic CSI Reporting

The feeding back the aperiodic CSI reporting of one component carrier at a time refers to that one aperiodic CSI reporting triggering command triggers the UE to feed back the aperiodic CSI reporting of one component carrier on one subframe.

The feeding back the aperiodic CSI reporting of multiple component carriers at a time refers to that one aperiodic CSI reporting triggering command triggers the UE to feed back the aperiodic CSI reporting of one or multiple component carriers on one subframe; or, the feeding back the aperiodic CSI reporting of multiple component carriers at a time refers to that multiple aperiodic CSI reporting triggering commands trigger the UE to feed back the aperiodic CSI reporting of multiple component carriers on one subframe.

Or, the feeding back the aperiodic CSI reporting of multiple component carriers at a time refers to that one aperiodic CSI reporting triggering command triggers the UE to feed back in turn the aperiodic CSI reporting of each component carrier in multiple component carriers according to a certain rule on multiple subframes.

The eNB triggers the UE to feed back the aperiodic CSI reporting through a triggering command.

The triggering command is a CQI request, and the aperiodic CSI reporting is triggered when CQI request=1.

The CQI request can be sent through a random access response to the UE initiating a corresponding random access, and also can be sent through the PDCCH with a particular DCI format to the scheduled UE. The PDCCH with the particular DCI format is used to schedule PUSCH.

Preferably, the triggered aperiodic CSI reporting is transmitted in the PUSCH which is scheduled by the PDCCH bearing the triggering command.

Preferably, the PUSCH which is scheduled by the PDCCH triggering the UE to feed back the aperiodic CSI reporting of multiple CCs does not transmit the transport block bearing UL-SCH.

Preferably, the multiple CCs refer to the CCs configured with identical aperiodic CSI reporting modes in the component carriers configured or activated for the UE.

Preferably, the multiple CCs refer to the CCs configured with identical downlink transmission mode and identical aperiodic CSI reporting mode in the component carriers configured or activated for the UE.

When the UE feeds back the aperiodic CSI reporting, the aperiodic CSI reporting of corresponding CCs are fed back according to the configured aperiodic CSI reporting mode of each CC.

If the eNB indicates the UE to feed back the aperiodic CSI reporting of one CC at a time, the UE feeds back the aperiodic CSI reporting of one corresponding CC according to the triggering command under one trigger, and different triggering commands correspond to different CCs.

If the eNB indicates the UE to feed back the aperiodic CSI reporting of multiple CCs at a time and the CCs configured or activated for the UE are divided into multiple groups, the UE feeds back the aperiodic CSI reporting of a group of corresponding CCs according to the triggering command under one trigger, and different triggering commands correspond to different groups.

The corresponding relationship between the triggering command and the one or multiple CCs which are triggered are determined according to predefined rules.

Wherein, the eNB indicates the UE to feed back the aperiodic CSI reporting in the following three ways: semi-static configuration, dynamic indication, and combination of the semi-static configuration and the dynamic indication. It is further illustrated in the following.

1. Semi-Static Configuration of Aperiodic CSI Reporting Way

The eNB configures the UE to feed back the aperiodic CSI reporting of one or multiple CCs at a time through high layer signaling.

Embodiment Three

Two aperiodic CSI reporting ways are defined.

Way one, the aperiodic CSI reporting of one CC is fed back at a time;

Way two, the aperiodic CSI reporting of multiple CCs is fed back at a time.

The eNB configures the aperiodic CSI reporting way of a certain UE to be way one or way two through high layer signaling. When it is configured to be way two, the UE feeds back the aperiodic CSI reporting of all the configured or activated (downlink) CCs at a time.

In the TDD system, the eNB configures or activates three CCs for the UE, which are respectively CC0, CC1 and CC2.

If the aperiodic CSI reporting way of the UE is configured to be way one:

when the UE detects a PDCCH which belongs to the UE and is with the particular downlink control information format, the PDCCH schedules the UE to send PUSCH on CC0 (or CC1, or CC2), and wherein CQI request=1, the UE is triggered to feed back the aperiodic CSI reporting of CC0 (or CC1 or CC2).

If the aperiodic CSI reporting way of the UE is configured to be way two:

when the UE detects a PDCCH which belongs to the UE and is with the particular downlink control information format, the PDCCH schedules the UE to send PUSCH on CC0 or CC1 or CC2, and wherein CQI request=1, the UE is triggered to feed back the aperiodic CSI reporting of CC0, CC1 and CC2.

Embodiment Four

The eNB enables a certain UE to feed back the aperiodic CSI reporting of multiple CCs at a time through high layer signaling.

For a certain UE, if it is not enabled to feed back the aperiodic CSI reporting of multiple CCs at a time, the UE feeds back the aperiodic CSI reporting of one configured or activated (downlink) CC at a time; if for the UE, it is enabled to feed back the periodic CSI reporting of multiple CCs at a time, the UE feeds back the aperiodic CSI reporting of all the configured or activated (downlink) CCs at a time.

Embodiment Five

Two aperiodic CSI reporting ways are defined.

Way one, the aperiodic CSI reporting of one CC is fed back at a time;

Way two, the aperiodic CSI reporting of a group of CCs is fed back at a time.

The eNB configures the aperiodic CSI reporting way of a certain UE to be way one or way two through high layer signaling.

In the TDD system, the eNB configures or activates three CCs for the UE, which are respectively CC0, CC1 and CC2. Wherein, the CC0 and CC1 are configured to be a group of CCs by the high layer, and CC2 is another group of CCs.

If the aperiodic CSI reporting way of the UE is configured to be way one:

when the UE detects a PDCCH which belongs to the UE and is with the particular downlink control information format, the PDCCH schedules the UE to send PUSCH on CC0 (or CC1, or CC2), and wherein CQI request=1, the UE is triggered to feed back the aperiodic CSI reporting of CC0 (or CC1 or CC2).

If the aperiodic CSI reporting way of the UE is configured to be way two:

when the UE detects a PDCCH which belongs to the UE and is with the particular downlink control information format, the PDCCH schedules the UE to send PUSCH on CC0 or CC1, and wherein CQI request=1, the UE is triggered to feed back the aperiodic CSI reporting of CC0 and CC1;

when the UE detects a PDCCH which belongs to the UE and is with the particular downlink control information format, the PDCCH schedules the UE to send PUSCH on CC2, and wherein, CQI request=1, the UE is triggered to feed back the aperiodic CSI reporting of CC2.

2. Dynamic Indication of the Aperiodic CSI Reporting Way

The eNB dynamically indicates the UE to feed back the aperiodic CSI reporting of one or multiple CCs at a time.

The eNB triggers the UE to feed back the aperiodic CSI reporting through a triggering command.

The triggering command is a CQI request, and when CQI request=1, the aperiodic CSI reporting is triggered.

The CQI request can be sent through a random access response to the UE initiating the corresponding random access, and also can be sent through the PDCCH with the particular DCI format to the scheduled UE.

The PDCCH with the particular DCI format is used to schedule PUSCH.

Preferably, the triggered aperiodic CSI reporting is transmitted in the PUSCH which is scheduled by the PDCCH bearing the triggering command.

Preferably, the PUSCH which is scheduled by the PDCCH triggering the UE to feed back the aperiodic CSI reporting of multiple CCs does not transmit the transport block bearing UL-SCH.

The triggering command included in the random access response is used to trigger the UE to feed back the aperiodic CSI reporting of one CC by default or is used to trigger the UE to feed back the aperiodic CSI reporting of multiple CCs by default.

That is to say, when the UE detects the random access response belonging to the UE and the CQI request=1 in the response, the UE is triggered to feed back the aperiodic CSI reporting of one CC.

Preferably, the one CC is the CC sending the random access response.

Or, when the UE detects the random access response belonging to the UE and the CQI request=1 in the response, the UE is triggered to feed back the aperiodic CSI reporting of multiple CCs.

Method One

One triggering command is used to trigger the UE to feed back the aperiodic CSI reporting of one CC.

For the UE, there can be multiple triggering commands on one subframe to trigger the aperiodic CSI reporting.

On one subframe, the eNB uses one triggering command to trigger the UE to feed back the aperiodic CSI reporting of one corresponding CC, or the eNB uses multiple triggering commands to trigger the UE simultaneously to feed back the aperiodic CSI reporting of multiple corresponding CCs.

Embodiment Six

In the FDD system, the eNB configures or activates four pairs of CCs for the UE, which are respectively DL CC0 and UL CC0, DL CC1 and UL CC1, DL CC2 and UL CC2, as well as DL CC3 and UL CC3.

If on one subframe, the UE detects one PDCCH which belongs to the UE and is with the particular DCI format, the PDCCH schedules the UE to send PUSCH on UL CC0, and wherein, CQI request=1, the UE is triggered to feed back the aperiodic CSI reporting of DL CC0.

If on one subframe, the UE detects 2 PDCCHs which belong to the UE and are with the particular DCI format, the 2 PDCCHs schedule the UE to send PUSCH on UL CC1 and UL CC2 respectively, and in the PDCCH which performs scheduling to send PUSCH on UL CC1, CQI request=0 and in the PDCCH which performs scheduling to send PUSCH on UL CC2, CQI request=0, and the UE is triggered to feed back the aperiodic CSI reporting of DL CC 1.

If on one subframe, the UE detects 2 PDCCHs which belong to the UE and are with the particular DCI format, the 2 PDCCHs schedule the UE to send PUSCH on UL CC0 and UL CC3 respectively, and in both PDCCHS, CQI request=1, and the UE is triggered to feed back the aperiodic CSI reporting of DL CC0 and DL CC3.

Method Two

In PDCCH with the particular DCI format, when the CQI request indicates triggering the aperiodic CSI reporting (such as CQI request=1), and NDI (New Data Indicator) is the first preset value (such as NDI=1 or 0), $I_{MCS}$=29, and the bandwidth of the scheduled PUSCH $N_{PRB} \leq 4$, the UE is triggered to feed back the aperiodic CSI reporting of multiple CCs. When the CQI request indicates triggering the aperiodic CSI reporting (such as CQI request=1), and NDI is the second preset value (such as NDI=0 or 1), $I_{MCS}$=29, and the bandwidth of the scheduled PUSCH $N_{PRB} \leq 4$, the UE is triggered to feed back the aperiodic CSI reporting of one CC.

In PDCCH with the particular DCI format, when the CQI request indicates triggering the aperiodic CSI reporting (such as CQI request=1), $I_{MCS}$=29, and the bandwidth of the scheduled PUSCH $N_{PRB} \leq 4$, the PUSCH scheduled by the PDCCH does not transmit the TB bearing the UL-SCH.

Preferably, in PDCCH with the particular DCI format, when the CQI request indicates triggering the aperiodic CSI reporting (such as CQI request=1), and $I_{MCS} \neq 29$ or the bandwidth of the scheduled PUSCH $N_{PRB} > 4$, the UE is triggered to feed back the aperiodic CSI reporting of one CC.

Preferably, for the UE, there is at most one triggering command on one subframe to trigger the aperiodic CSI reporting.

That is to say, when the UE detects the PDCCH which belongs to the UE and is with the particular DCI format, and wherein CQI request=1, NDI=1, $I_{MCS}$=29, and the bandwidth of scheduled PUSCH $N_{PRB} \leq 4$, the UE is triggered to feed back the aperiodic CSI reporting of multiple corresponding CCs.

Preferably, the aperiodic CSI reporting of multiple corresponding CCs is transmitted in the PUSCH scheduled by the PDCCH.

When the UE detects the PDCCH which belongs to the UE and is with the particular DCI format, and wherein CQI request=1, NDI=0, $I_{MCS}$=29, and the bandwidth of scheduled PUSCH $N_{PRB} \leq 4$, the UE is triggered to feed back the aperiodic CSI reporting of one corresponding CC.

Preferably, the aperiodic CSI reporting of the one corresponding CC is transmitted in the PUSCH scheduled by the PDCCH.

Method Three

In PDCCH with the particular DCI format, when the CQI request indicates triggering the aperiodic CSI reporting (such as CQI request=1), and NDI and/or $I_{MCS}$ is in a preset state, the UE is triggered to feed back the aperiodic CSI reporting of multiple CCs. When the CQI request indicates triggering the aperiodic CSI reporting (such as CQI request=1), and the NDI and/or $I_{MCS}$ is not in a preset state, the UE is triggered to feed back the aperiodic CSI reporting of one CC.

Preferably, for the UE, there is at most one triggering command on one subframe to trigger the aperiodic CSI reporting.

Embodiment Seven

In PDCCH with the particular DCI format, when CQI request=1, NDI=1, and $I_{MCS}$ is equal to any integer from 29 to 31 or a preset integer, the UE is triggered to feed back the aperiodic CSI reporting of multiple CCs. When CQI request=1, NDI=0 or $I_{MCS}$ is not equal to any integer from 29 to 31 or a preset integer, the UE is triggered to feed back the aperiodic CSI reporting of one CC.

Then, when the UE detects the PDCCH which belongs to the UE and is with the particular DCI format, and wherein, CQI request=1, NDI=1, $I_{MCS}$ is equal to any integer from 29 to 31 or a preset integer, the UE is triggered to feed back the aperiodic CSI reporting of multiple corresponding CCs.

When the UE detects the PDCCH which belongs to the UE and is with the particular DCI format, and wherein, CQI request=1, NDI=1, $I_{MCS}$ is not equal to any integer from 29 to 31 or a preset integer, the UE is triggered to feed back the aperiodic CSI reporting of one corresponding CC.

Embodiment Eight

In PDCCH with the particular DCI format, when CQI request=1, NDI=0, and $I_{MCS}$ is equal to any integer from 0 to 28 or a preset integer, the UE is triggered to feed back the aperiodic CSI reporting of multiple CCs. When CQI request=1, NDI=1 or $I_{MCS}$ is not equal to any integer from 0 to 28 or a preset integer, the UE is triggered to feed back the aperiodic CSI reporting of one CC.

Then, when the UE detects the PDCCH which belongs to the UE and is with the particular DCI format, and wherein, CQI request=1, NDI=0, and $I_{MCS}$ is equal to any integer from 0 to 28 or a preset integer, the UE is triggered to feed back the aperiodic CSI reporting of multiple corresponding CCs.

When the UE detects the PDCCH which belongs to the UE and is with the particular DCI format, and wherein, CQI request=1, NDI=1 or $I_{MCS}$ is not equal to any integer from 0 to 28 or a preset integer, the UE is triggered to feed back the aperiodic CSI reporting of one corresponding CC.

Method Four

In PDCCH with the particular DCI format, when the CQI request indicates triggering the aperiodic CSI reporting, such as CQI request=1, an aperiodic CSI reporting way identification field is carried in the PDCCH to indicate that the UE is triggered to feed back the aperiodic CSI reporting of one or multiple CCs, wherein, the aperiodic CSI reporting way identification field can be of 1 bit.

Preferably, when CQI request indicates that the aperiodic CSI reporting is not triggered (such as CQI request=0), the aperiodic CSI reporting way identification field is used to indicate the uplink scheduling information of the scheduled PUSCH, for example, the aperiodic CSI reporting way identification field is a hopping flag;

or, the aperiodic CSI reporting way identification field is one bit of 5 bits MCS, such as the highest bit;

or, the aperiodic CSI reporting way identification field is one bit of 2 bits TPC command;

or, the aperiodic CSI reporting way identification field is one bit of 3 bits cyclic shift for DM RS.

Preferably, for the UE, on one subframe, there is at most one triggering command to trigger the aperiodic CSI reporting, Embodiment Nine In PDCCH with the particular DCI format, when CQI request=1, 1 bit in the PDCCH is used to indicate and trigger the UE to feed back the aperiodic CSI reporting of multiple or one CC: when the 1 bit is set as "1", the UE is triggered to feed back the aperiodic CSI reporting of multiple CCs; when the 1 bit is set as "0", the UE is triggered to feed back the aperiodic CSI reporting of one CC.

In PDCCH with the particular DCI format, when CQI request=0, the 1 bit in the PDCCH is the hopping flag, which indicates whether the PUSCH scheduled by the PDCCH is hopping enabled.

Then, when the UE detects the PDCCH which belongs to the UE and is with the particular DCI format, and wherein CQI request=1, if the 1 bit is set as "1", the UE is triggered to feed back the aperiodic CSI reporting of multiple corresponding CCs; if the 1 bit is set as "0", the UE is triggered to feed back the aperiodic CSI reporting of one corresponding CC. And, the scheduled PUSCH is hopping enabled (or hopping not enabled) by default.

When the UE detects the PDCCH which belongs to the UE and is with the particular DCI format, and wherein CQI request=0, if the 1 bit is set as "1", the scheduled PUSCH is hopping enabled, if the 1 bit is set as "0", the scheduled PUSCH is hopping not enabled.

Embodiment Ten

In PDCCH with the particular DCI format, when CQI request=1, 1 bit in the PDCCH is used to indicate and trigger the UE to feed back the aperiodic CSI reporting of multiple or one CC: when the 1 bit is set as "1", the UE is triggered to feed back the aperiodic CSI reporting of multiple CCs; when the 1 bit is set as "0", the UE is triggered to feed back the aperiodic CSI reporting of one CC.

In PDCCH with the particular DCI format, when CQI request=0, the 1 bit in the PDCCH is the highest bit (or the lowest bit) of the 5 bits MCS index, which indicates the MCS and RV of the PUSCH scheduled by the PDCCH.

Then, when the UE detects the PDCCH which belongs to the UE and is with the particular DCI format, and wherein CQI request=1, if the 1 bit is set as "1", the UE is triggered to feed back the aperiodic CSI reporting of multiple corresponding CCs; if the 1 bit is set as "0", the UE is triggered to feed back the aperiodic CSI reporting of one corresponding CC. And, the value range of the MCS index of the scheduled PUSCH is 0 to 15 (or 16 preset integers among 0-31).

When the UE detects the PDCCH which belongs to the UE and is with the particular DCI format, and wherein CQI request=0, if the 1 bit is the highest bit of the 5 bits MCS index, the value range of the MCS index of the scheduled PUSCH is 0-31.

Embodiment Eleven

In PDCCH with the particular DCI format, when CQI request=1, 1 bit in the PDCCH is used to indicate and trigger the UE to feed back the aperiodic CSI reporting of multiple or one CC: when the 1 bit is set as "1", the UE is triggered to feed back the aperiodic CSI reporting of multiple CCs; when the 1 bit is set as "0", the UE is triggered to feed back the aperiodic CSI reporting of one CC.

In PDCCH with the particular DCI format, when CQI request=0, the 1 bit in the PDCCH is the highest bit (or the lowest bit) of the 3 bits cyclic shift for DM RS, which indicates the cyclic shift for DM RS and OCC of the PUSCH scheduled by the PDCCH.

Then, when the UE detects the PDCCH which belongs to the UE and is with the particular DCI format, and wherein CQI request=1, if the 1 bit is set as "1", the UE is triggered to feed back the aperiodic CSI reporting of multiple corresponding CCs; if the 1 bit is set as "0", the UE is triggered to feed back the aperiodic CSI reporting of one corresponding CC. And, the value range of the cyclic shift for DM RS of the scheduled PUSCH is 4 preset values in {0, 2, 3, 4, 6, 8, 9, 10}.

When the UE detects the PDCCH which belongs to the UE and is with the particular DCI format, and wherein CQI request=0, if the 1 bit is the highest bit of the 5 bits MCS index, the value range of the MCS index of the scheduled PUSCH is {0, 2, 3, 4, 6, 8, 9, 10}.

Method Five

In PDCCH with the particular DCI format, when the CQI request indicates triggering the aperiodic CSI reporting (such as CQI request=1), and the PDCCH schedules the UE to send PUSCH on the preset CC, the UE is triggered to feed back the aperiodic CSI reporting of multiple CCs; otherwise, the UE is triggered to feed back the aperiodic CSI reporting of one CC.

Preferably, the particular CC is one or more.

Preferably, the particular CC is only the PCC.

For example, when the UE detects the PDCCH which belongs to the UE and is with the particular DCI format, the PDCCH schedules the UE to send the PUSCH on its PCC, and wherein CQI request=1, the UE is triggered to feed back the aperiodic CSI reporting of multiple corresponding CCs;

when the UE detects the PDCCH which belongs to the UE and is with the particular DCI format, the PDCCH schedules the UE to send the PUSCH on its SCC, and wherein CQI request =1, the UE is triggered to feed back the aperiodic CSI reporting of one corresponding CC.

Embodiment Twelve

In the FDD system, in the PDCCH with the particular DCI format, when CQI request=1, and the PDCCH schedules the UE to send the PUSCH on its uplink PCC, the UE is triggered to feed back the aperiodic CSI reporting of a group of DL CCs. Wherein, a group of DL CCs in this embodiment includes: the DL PCC of the UE, and the DL SCC whose corresponding UL CC is not configured or activated for the UE (if there exists such DL SCC) in the DL SCCs currently configured or activated for the UE.

Otherwise, when CQI request=1, and the PDCCH schedules the UE to send the PUSCH on its UL SCC, the UE is triggered to feed back the aperiodic CSI reporting of the DL CC corresponding to the UL SCC.

For example, in the FDD system, the eNB configures or activates a pair of PCCs, DL CC0 and UL CC0, a pair of SCCs, DL CC1 and UL CC1, and two DL SCCs, DL CC2 and DL CC3 (whose corresponding UL SCCs, UL CC2 and UL CC3, are not configured or activated) for the UE. Wherein, the DL CC0, DL CC2, and DL CC3 are preset to be a group of CCs.

If on one subframe, the UE detects one PDCCH which belongs to the UE and is with the particular DCI format, the PDCCH schedules the UE to send PUSCH on UL CC0, and wherein CQI request=1, the UE is triggered to feed back the aperiodic CSI reporting of DL CC0, DL CC2 and DL CC3.

If on one subframe, the UE detects one PDCCH which belongs to the UE and is with the particular DCI format, the PDCCH schedules the UE to send PUSCH on UL CC1, and wherein CQI request=1, the UE is triggered to feed back the aperiodic CSI reporting of DL CC1.

Embodiment Thirteen

In the FDD system, the eNB configures or activates a pair of PCCs, DL CC0 and UL CC0, a pair of SCCs, DL CC1 and UL CC1, and two DL SCCs, DL CC2 and DL CC3 (whose corresponding UL SCCs, UL CC2 and UL CC3, are not configured or activated) for the UE. Wherein, the DL CC0 and DL CC2 belong to one group, and DL CC1 and DL CC3 belong to another group.

If on one subframe, the UE detects one PDCCH which belongs to the UE and is with the particular DCI format, the PDCCH schedules the UE to send PUSCH on UL CC0, and wherein CQI request=1, the UE is triggered to feed back the aperiodic CSI reporting of DL CC0 and DL CC2.

If on one subframe, the UE detects one PDCCH which belongs to the UE and is with the particular DCI format, the PDCCH schedules the UE to send PUSCH on UL CC1, and wherein CQI request=1, the UE is triggered to feed back the aperiodic CSI reporting of DL CC1 and DL CC3.

Method Six:

During cross-carrier scheduling, in the PDCCH with the particular DCI format, when the CQI request indicates triggering the aperiodic CSI reporting (such as CQI request=1), and the CIF is a preset value, the UE is triggered to feed back the aperiodic CSI reporting of multiple CCs; otherwise, the UE is triggered to feed back the aperiodic CSI reporting of one CC.

Embodiment Fourteen

During cross-carrier scheduling, when the UE detects the PDCCH which belongs to the UE and is with the particular DCI format, and wherein CQI request=1, CIF is equal to any integer in 5-7 or a preset inter value, the UE is triggered to feed back the aperiodic CSI reporting of multiple corresponding CCs;

when the UE detects the PDCCH which belongs to the UE and is with the particular DCI format, and wherein CQI request=1, CIF is equal to any integer in 0-4, the UE is triggered to feed back the aperiodic CSI reporting of one corresponding CC.

Embodiment Fifteen

The eNB configures or activates 4 CCs for a certain UE. During cross-carrier scheduling, when the UE detects the PDCCH which belongs to the UE and is with the particular DCI format, and wherein CQI request=1, CIF is equal to any integer in 4-7 or a preset integer, the UE is triggered to feed back the aperiodic CSI reporting of multiple corresponding CCs;

when the UE detects the PDCCH which belongs to the UE and is with the particular DCI format, and wherein CQI request=1, CIF is equal to any integer in 0-3, the UE is triggered to feed back the aperiodic CSI reporting of one corresponding CC.

Embodiment Sixteen

In the FDD system, the eNB configures or activates a pair of PCCs, DL CC0 and UL CC0, a pair of SCCs, DL CC1 and UL CC1, and two DL SCCs, DL CC2 and DL CC3 (whose corresponding UL SCCs, UL CC2 and UL CC3, are not configured or activated) for the UE. Wherein, the DL CC0, DL CC2 and DL CC3 belong to one group.

During cross-carrier scheduling, when the UE detects the PDCCH which belongs to the UE and is with the particular DCI format, and wherein CQI request=1, CIF is equal to any integer in 2-7, the UE is triggered to feed back the aperiodic CSI reporting of DL CC0, DL CC2 and DL CC3.

When the UE detects the PDCCH which belongs to the UE and is with the particular DCI format, and wherein CQI request=1, CIF=0 (or 1), the UE is triggered to feed back the aperiodic CSI reporting of DL CC0 (or DL CC1).

Embodiment Seventeen

In the FDD system, the eNB configures or activates a pair of PCCs, DL CC0 and UL CC0, a pair of SCCs, DL CC1 and UL CC1, and two DL SCCs, DL CC2 and DL CC3 (whose corresponding UL SCCs, UL CC2 and UL CC3, are not configured or activated) for the UE. Wherein, the DL CC0 and DL CC2 belong to one group, and DL CC1 and DL CC3 belong to another group.

During cross-carrier scheduling, when the UE detects the PDCCH which belongs to the UE and is with the particular DCI format, and wherein CQI request=1, CIF=2, the UE is triggered to feed back the aperiodic CSI reporting of DL CC0 and DL CC2.

During cross-carrier scheduling, when the UE detects the PDCCH which belongs to the UE and is with the particular DCI format, and wherein CQI request=1, CIF=3, the UE is triggered to feed back the aperiodic CSI reporting of DL CC1 and DL CC3.

When the UE detects the PDCCH which belongs to the UE and is with the particular DCI format, and wherein CQI request=1, CIF=0 (or 1), the UE is triggered to feed back the aperiodic CSI reporting of DL CC0 (or DL CC1).

3. Semi-Static Configuration+Dynamic Indication of the Aperiodic CSI Reporting Way The eNB triggers the UE to feed back the aperiodic CSI reporting of one or multiple CCs at a time through a way of combining the high layer signalling configuration with the dynamic indication.

Preferably, the eNB triggers enables through the high layer signalling that the aperiodic CSI reporting of multiple CCs are fed back at a time.

When it is not enabled to feed back the aperiodic CSI reporting of multiple CCs at a time, one triggering command triggers the UE to feed back the aperiodic CSI reporting of one CC.

When it is enabled to feed back the aperiodic CSI reporting of multiple CCs at a time, the method described in the dynamic indication of aperiodic CSI reporting way is used to trigger the UE to feed back the aperiodic CSI reporting of one or multiple CCs at a time.

Or, preferably, the eNB configures the UE through high layer signalling to feed back the aperiodic CSI reporting of one or multiple CCs at a time.

When the aperiodic CSI reporting way of the UE is configured to feed back the aperiodic CSI reporting of one CC at a time, one triggering command triggers the UE to feed back the aperiodic CSI reporting of one CC.

When the aperiodic CSI reporting way of the UE is configured to feed back the aperiodic CSI reporting of multiple CCs at a time, dynamic indication is used to trigger the UE to feed back the aperiodic CSI reporting of one or multiple CCs at a time. The specific dynamic indication method can refer to the methods mentioned in the above dynamic indication description. Of course, the present invention is not limited to the above mentioned methods.

Embodiment Eighteen

Two aperiodic CSI reporting ways are defined.

Way one, the aperiodic CSI reporting of one CC is fed back at a time;

Way two, the aperiodic CSI reporting of multiple CCs is fed back at a time.

The eNB configures the aperiodic CSI reporting way of a certain UE to be way one or way two through high layer signaling.

In the FDD system, the eNB configures or activates a pair of PCCs, DL CC0 and UL CC0, a pair of SCCs, DL CC1 and UL CC1, and 2 DL SCCs, DL CC2 and DL CC3 (whose corresponding UL SCCs, UL CC2 and UL CC3, are not configured or activated) for the UE. Wherein, the DL CC0, DL CC2 and DL CC3 belong to one group.

If the aperiodic CSI reporting way of the UE is configured to be way one:

if on one subframe, the UE detects one PDCCH which belongs to the UE and is with the particular downlink control information format, the PDCCH schedules the UE to send PUSCH on UL CC0 (or UL CC1), and wherein CQI request=1, the UE is triggered to feed back the aperiodic CSI reporting of DL CC0 (or DL CC1).

If the aperiodic CSI reporting way of the UE is configured to be way two:

if on one subframe, the UE detects one PDCCH which belongs to the UE and is with the particular downlink control information format, the PDCCH schedules the UE to send PUSCH on UL CC0, and wherein CQI request=1, the UE is triggered to feed back the aperiodic CSI reporting of DL CC0, DL CC2 and DL CC3.

If on one subframe, the UE detects one PDCCH which belongs to the UE and is with the particular downlink control information format, the PDCCH schedules the UE to send PUSCH on UL CC1, and wherein CQI request=1, the UE is triggered to feed back the aperiodic CSI reporting of DL CC1.

Embodiment Nineteen

The eNB enables a certain UE to feed back the aperiodic CSI reporting of multiple CCs at a time through high layer signaling.

In the FDD system, the eNB configures or activates a pair of PCCs, DL CC0 and UL CC0, a pair of SCCs, DL CC1 and UL CC1, and 2 DL SCCs, DL CC2 and DL CC3 (whose corresponding UL SCCs, UL CC2 and UL CC3, are not configured or activated) for the UE. Wherein, the DL CC0 and DL CC2 belong to one group, and DL CC1 and DL CC3 belong to one group.

If for the UE, it is not enabled to feed back the aperiodic CSI reporting of multiple CCs at a time:

if on one subframe, the UE detects one PDCCH which belongs to the UE and is with the particular downlink control information format, the PDCCH schedules the UE to send PUSCH on UL CC0 (or UL CC1), and wherein CQI request=1, the UE is triggered to feed back the aperiodic CSI reporting of DL CC0 (or DL CC1).

If for the UE, it is enabled to feed back the aperiodic CSI reporting of multiple CCs at a time:

if on one subframe, the UE detects one PDCCH which belongs to the UE and is with the particular downlink control information format, the PDCCH schedules the UE to send PUSCH on UL CC0, and wherein CQI request=1, the UE is triggered to feed back the aperiodic CSI reporting of DL CC0 and DL CC2;

if on one subframe, the UE detects one PDCCH which belongs to the UE and is with the particular downlink control information format, the PDCCH schedules the UE to send PUSCH on UL CC1, and wherein CQI request=1, the UE is triggered to feed back the aperiodic CSI reporting of DL CC1 and DL CC3.

In the above mentioned methods, the feeding back multiple CCs at a time can also be replaced with the feeding back a group of CCs at a time.

Those skilled in the art may understand all or part of the steps in the above method may be completed by programs instructing related hardware, and the programs may be stored in computer readable storage medium, such as read only memory, magnetic disk or optical disk and so on. Optionally, all or part of the steps of the above examples may also be implemented with one or more integrated circuits. Accordingly, all the modules/units in the above examples may be implemented by way of hardware or implemented by way of software functional modules. The invention is not limited to the combination of hardware and software in any form.

The above description is just the preferred embodiments of the invention, but the protection scope of the invention is not limited herein, and there may be various changes or replacements in the invention for those skilled in the art. Any modification, equivalent replacement, improvements and so on, made in the spirit and principle of the invention should be covered by the protection scope of the invention.

INDUSTRIAL APPLICABILITY

In the invention, the problem how the UE performs channel state information reporting for multiple (downlink) component carriers in the LTE-A system is solved, which not only ensures the reliability of transmitting channel state information but also reduces the feedback delay of channel state information as soon as possible.

What is claimed is:

1. A method for reporting channel state information, comprising:
    an eNodeB (eNB) indicating a User Equipment (UE), through a first higher layer signaling, to feed back an aperiodic Channel State Information (CSI) reporting of one or multiple component carriers, and when indicating the UE to feed back the aperiodic CSI reporting of the multiple component carriers, further indicating the UE, through 2-bit physical layer signaling, to feed back the aperiodic CSI reporting of one component carrier at a time or to feed back the aperiodic CSI reporting of the multiple component carriers at a time;

wherein, the multiple component carriers comprise one or more groups of component carriers; each group of component carriers is configured by a second higher layer signaling.

2. The method according to claim 1, wherein, feeding back the aperiodic CSI reporting of one component carrier at a time or feeding back the aperiodic CSI reporting of multiple component carriers at a time refers to feeding back the aperiodic CSI reporting of one component carrier in a subframe at a time or feeding back the aperiodic CSI reporting of multiple component carriers in a subframe at a time.

3. The method according to claim 1, wherein,
the multiple component carriers are component carriers configured with an identical aperiodic CSI reporting mode in component carriers configured or activated for the UE, or component carriers configured with an identical downlink transmission mode and the identical aperiodic CSI reporting mode in the component carriers configured or activated for the UE.

4. The method according to claim 1, wherein,
the feeding back the aperiodic CSI reporting of one component carrier at a time refers to that one aperiodic CSI reporting triggering command triggers the UE to feed back the aperiodic CSI reporting of one component carrier in one subframe;
the feeding back the aperiodic CSI reporting of multiple component carriers at a time refers to that one aperiodic CSI reporting triggering command triggers the UE to feed back the aperiodic CSI reporting of one component carrier in one subframe or to feed back the aperiodic CSI reporting of multiple component carriers in one subframe;
or, the feeding back the aperiodic CSI reporting of multiple component carriers at a time refers to that multiple aperiodic CSI reporting triggering commands trigger the UE to feed back the aperiodic CSI reporting of multiple component carriers in one subframe;
or, the feeding back the aperiodic CSI reporting of multiple component carriers at a time refers to that one aperiodic CSI reporting triggering command triggers the UE to feed back in turn the aperiodic CSI reporting of each component carrier in multiple component carriers according to a certain rule in multiple subframes.

5. The method according to claim 1, wherein, the step of the eNB indicating the UE to feed back the aperiodic CSI reporting of one or multiple component carriers further comprises:
the eNB indicating the UE to feed back the aperiodic CSI reporting of one or multiple component carriers at a time through a dynamic indication; or indicating the UE to feed back the aperiodic CSI reporting of one or multiple component carriers at a time through a way of combining high layer signaling configuration with dynamic indication.

6. The method according to claim 5, wherein, the dynamic indication comprises: in a Physical Downlink Control Channel (PDCCH) with a particular downlink control information format, when a Channel Quality Indication (CQI) request indicates that the aperiodic CSI reporting is triggered, and a New Data Indicator (NDI) is a first preset value, $I_{MCS}=29$, and bandwidth of scheduled Physical Uplink Shared Channel (PUSCH) $N_{PRB}\leq 4$, triggering the UE to feed back the aperiodic CSI reporting of multiple component carriers; when the CQI request indicates that the aperiodic CSI reporting is triggered, and the NDI is a second preset value different from the first preset value, $I_{MCS}=29$, and the bandwidth of the scheduled PUSCH $N_{PRB}\leq 4$, triggering the UE to feed back the aperiodic CSI reporting of one component carrier;
or,
the dynamic indication further comprises: in the PDCCH with the particular downlink control information format, when the CQI request indicates that the aperiodic CSI reporting is triggered, and $I_{MCS}\neq 29$ or the bandwidth of the scheduled PUSCH $N_{PRB}>4$, triggering the UE to feed back the aperiodic CSI reporting of one component carrier;
wherein the $N_{PRB}$ refers to number of Physical Resource Blocks, and $I_{MCS}$ refers to Modulation and Coding Schemes Index.

7. The method according to claim 5, wherein, the dynamic indication comprises: in a PDCCH with a particular downlink control information format, when a CQI request indicates that the aperiodic CSI reporting is triggered, and a New Data Indicator (NDI) and/or Modulation and Coding Schemes Index ($I_{MCS}$) is in a preset state, triggering the UE to feed back the aperiodic CSI reporting of multiple component carriers; when the CQI request indicates that the aperiodic CSI reporting is triggered, and the NDI and/or $I_{MCS}$ is not in the preset state, triggering the UE to feed back the aperiodic CSI reporting of one component carrier;
or
the dynamic indication comprises: in a PDCCH with a particular downlink control information format, when a CQI request indicates that the aperiodic CSI reporting is triggered and the PDCCH schedules the UE to send PUSCH on a preset component carrier, triggering the UE to feed back the aperiodic CSI reporting of multiple component carriers; otherwise, triggering the UE to feed back the aperiodic CSI reporting of one component carrier;
or
the dynamic indication comprises: during cross-carrier scheduling, in a PDCCH with a particular downlink control information format, when a CQI request indicates that the aperiodic CSI reporting is triggered and a carrier indicator field (CIF) is a preset value, triggering the UE to feed back the aperiodic CSI reporting of multiple component carriers; otherwise, triggering the UE to feed back the aperiodic CSI reporting of one component carrier.

8. The method according to claim 5, wherein, the dynamic indication comprises: in a PDCCH with a particular downlink control information format, when a CQI request indicates that the aperiodic CSI reporting is triggered, an aperiodic CSI reporting way identification field being also carried in the PDCCH and being for indicating and triggering the UE to feed back the aperiodic CSI reporting of one component carrier or to feed back the aperiodic CSI reporting of multiple component carriers.

9. The method according to claim 8, wherein, when the CQI request indicates that the aperiodic CSI reporting is not triggered, the aperiodic CSI reporting way identification field is for indicating uplink scheduling information of scheduled PUSCH;
or
the aperiodic CSI reporting way identification field is of 1 bit.

10. The method according to claim 5, wherein, indicating the UE to feed back the aperiodic CSI reporting of one or multiple component carriers at a time through the way of combining high layer signaling configuration with dynamic indication comprises:

when the UE is configured through the high layer signaling to feed back the aperiodic CSI reporting of one component carrier at a time, one triggering command triggering the UE to feed back the aperiodic CSI reporting of one component carrier;

when the UE is configured through the high layer signaling to feed back the aperiodic CSI reporting of multiple component carriers at a time, triggering the UE to feed back the aperiodic CSI reporting of one or multiple component carriers at a time based on the dynamic indication of the eNB;

or, when the UE is configured through the high layer signaling to be unable to feed back the aperiodic CSI reporting of multiple component carriers at a time, one triggering command triggering the UE to feed back the aperiodic CSI reporting of one component carrier;

when the UE is configured through the high layer signaling to be able to feed back the aperiodic CSI reporting of multiple component carriers at a time, triggering the UE to feed back the aperiodic CSI reporting of one or multiple component carriers at a time based on the dynamic indication of the eNB.

11. An eNode B (eNB), which is configured to:

indicate a User Equipment (UE), through a first higher layer, to feed back an aperiodic Channel State Information (CSI) reporting of one or multiple component carriers, and when indicating the UE to feed back the aperiodic CSI reporting of the multiple component carriers, further indicating the UE, through 2-bit physical layer signaling, to feed back the aperiodic CSI reporting of one component carrier at a time or to feed back the aperiodic CSI reporting of the multiple component carriers at a time;

wherein, the multiple component carriers comprise one or more groups of component carriers; each group of component carriers is configured by a second higher layer signaling.

12. The eNB according to claim 11, wherein,
the eNB is configured to indicate the UE to feed back the aperiodic CSI reporting of one component carrier in a subframe at a time or to feed back the aperiodic CSI reporting of multiple component carriers in a subframe at a time.

13. The eNB according to claim 11, wherein,
the multiple component carriers are component carriers configured with an identical aperiodic CSI reporting mode in component carriers configured or activated for the UE, or component carriers configured with an identical downlink transmission mode and the identical aperiodic CSI reporting mode in the component carriers configured or activated for the UE.

14. The eNB according to claim 11, wherein,
the feeding back the aperiodic CSI reporting of one component carrier at a time refers to that one aperiodic CSI reporting triggering command triggers the UE to feed back the aperiodic CSI reporting of one component carrier in one subframe;

the feeding back the aperiodic CSI reporting of multiple component carriers at a time refers to that one aperiodic CSI reporting triggering command triggers the UE to feed back the aperiodic CSI reporting of one component carrier in one subframe or to feed back the aperiodic CSI reporting of multiple component carriers in one subframe;

or, the feeding back the aperiodic CSI reporting of multiple component carriers at a time refers to that multiple aperiodic CSI reporting triggering commands trigger the UE to feed back the aperiodic CSI reporting of multiple component carriers in one subframe;

or, the feeding back the aperiodic CSI reporting of multiple component carriers at a time refers to that one aperiodic CSI reporting triggering command triggers the UE to feed back in turn the aperiodic CSI reporting of each component carrier in multiple component carriers according to a certain rule in multiple subframes.

15. The eNB according to claim 11, wherein,
the eNB is configured to indicate the UE to feed back the aperiodic CSI reporting of one or multiple component carriers at a time through a dynamic indication; or indicate the UE to feed back the aperiodic CSI reporting of one or multiple component carriers at a time through a way of combining high layer signaling configuration with dynamic indication.

16. The eNB according to claim 15, wherein, the eNB is configured to perform the dynamic indication in a following way: in a Physical Downlink Control Channel (PDCCH) with a particular downlink control information format, when a Channel Quality Information (CQI) request indicates that the aperiodic CSI reporting is triggered, and a New Data Indicator (NDI) is a first preset value, $I_{MCS}=29$, and bandwidth of scheduled Physical Uplink Shared Channel (PUSCH) $N_{PRB} \leq 4$, triggering the UE to feed back the aperiodic CSI reporting of multiple component carriers; when the CQI request indicates that the aperiodic CSI reporting is triggered, and the NDI is a second preset value different from the first preset value, $I_{MCS}=29$, and the bandwidth of the scheduled PUSCH $N_{PRB} \leq 4$, triggering the UE to feed back the aperiodic CSI reporting of one component carrier;

or,
the eNB is configured to perform the dynamic indication in a following way: in the PDCCH with the particular downlink control information format, when the CQI request indicates that the aperiodic CSI reporting is triggered, and $I_{MCS} \neq 29$ or the bandwidth of the scheduled PUSCH $N_{PRB}>4$, triggering the UE to feed back the aperiodic CSI reporting of one component carrier;

wherein the $N_{PRB}$ refers to number of Physical Resource Blocks, and $I_{MCS}$ refers to Modulation and Coding Schemes Index.

17. The eNB according to claim 15, wherein,
the eNB is configured to perform the dynamic indication in a following way: in a PDCCH with a particular downlink control information format, when a CQI request indicates that the aperiodic CSI reporting is triggered, and a New Data Indicator (NDI) and/or Modulation and Coding Schemes Index ($I_{MCS}$) is in a preset state, triggering the UE to feed back the aperiodic CSI reporting of multiple component carriers; when the CQI request indicates that the aperiodic CSI reporting is triggered, and the NDI and/or $I_{MCS}$ is not in the preset state, triggering the UE to feed back the aperiodic CSI reporting of one component carrier; or the eNB is configured to perform the dynamic indication in a following way: in the PDCCH with the particular downlink control information format, when the CQI request indicates that the aperiodic CSI reporting is triggered, an aperiodic CSI reporting way identification field being also carried in the PDCCH and being for indicating and triggering the UE to feed back the aperiodic CSI reporting of one component carrier or to feed back the aperiodic CSI reporting of multiple component carriers; when the CQI request indicates that the aperiodic CSI reporting is not triggered, the aperiodic CSI reporting way identification field being for indicating uplink scheduling information of scheduled PUSCH; or, the eNB is configured to perform the dynamic indication in a following way: in the PDCCH with the particular downlink control information format, when the CQI request indicates that the aperiodic CSI reporting is triggered and the PDCCH schedules the UE to send PUSCH on a preset component carrier, triggering the UE to feed back the aperiodic CSI reporting of multiple component carriers; otherwise, triggering the UE to feed back the aperiodic CSI reporting of one component carrier; or, the eNB is configured to perform the dynamic indication in a following way: during cross-carrier scheduling, in the PDCCH with the particular downlink control information format, when the CQI request indicates that the aperiodic CSI reporting is triggered and a carrier indicator field (CIF) is a preset value, triggering the UE to feed back the aperiodic CSI reporting of multiple component carriers; otherwise, triggering the UE to feed back the aperiodic CSI reporting of one component carrier;

or, in the PDCCH with the particular downlink control information format, when the CQI request indicates that the aperiodic CSI reporting is triggered, the aperiodic CSI reporting way identification field is also carried in the PDCCH and is for indicating and triggering the UE to feed back the aperiodic CSI reporting of one component carrier or to feed back the aperiodic CSI reporting of multiple component carriers, and the aperiodic CSI reporting way identification field is of 1 bit.

* * * * *